US008136165B2

(12) United States Patent
Takala et al.

(10) Patent No.: US 8,136,165 B2
(45) Date of Patent: Mar. 13, 2012

(54) SECURING A DATA TRANSMISSION CHANNEL

(75) Inventors: Pasi Takala, Helsinki (FI); Jari Ollikka, Helsinki (FI)

(73) Assignee: Tectia Corporation, Helsinki (FI)

( * ) Notice: Subject to any disclaimer, the term of this patent is extended or adjusted under 35 U.S.C. 154(b) by 972 days.

(21) Appl. No.: 10/992,811

(22) Filed: Nov. 22, 2004

(65) Prior Publication Data
US 2005/0144474 A1   Jun. 30, 2005

(30) Foreign Application Priority Data
Nov. 26, 2003   (GB) .................................. 0327431.3

(51) Int. Cl.
*G06F 7/04* (2006.01)

(52) U.S. Cl. ......... 726/27; 726/2; 726/3; 726/4; 726/11; 726/14; 726/15; 713/1; 713/2; 713/153; 713/100; 709/238; 709/239; 709/240; 709/241; 709/242

(58) Field of Classification Search .................. 726/2–4, 726/11, 14–15; 713/1–2, 153, 100; 709/238–242
See application file for complete search history.

(56) References Cited

U.S. PATENT DOCUMENTS

| | | | |
|---|---|---|---|
| 6,253,320 B1 * | 6/2001 | Sekiguchi et al. ................. | 713/2 |
| 6,560,699 B1 * | 5/2003 | Konkle ............................. | 713/1 |
| 6,799,270 B1 * | 9/2004 | Bull et al. ..................... | 713/153 |
| 7,131,141 B1 * | 10/2006 | Blewett et al. .................. | 726/12 |
| 2002/0032758 A1 * | 3/2002 | Yen et al. ...................... | 709/220 |
| 2002/0083228 A1 * | 6/2002 | Chiloyan et al. ................. | 710/9 |
| 2002/0156870 A1 * | 10/2002 | Boroumand et al. ......... | 709/219 |
| 2003/0039234 A1 * | 2/2003 | Sharma et al. ................ | 370/338 |
| 2003/0195975 A1 * | 10/2003 | Papadopoulos et al. ....... | 709/230 |
| 2004/0019806 A1 * | 1/2004 | Beyh ............................. | 713/201 |
| 2004/0148371 A1 * | 7/2004 | Lin et al. ........................ | 709/223 |
| 2004/0243996 A1 * | 12/2004 | Sheehy et al. ................. | 717/174 |
| 2005/0050353 A1 * | 3/2005 | Thiele et al. ................... | 713/201 |

(Continued)

OTHER PUBLICATIONS

Daniel J. Barrett and Richard E. Silverman, "SSH: The Secure Shell, The Definitive Guide", 1st Edition, Feb. 2001, See in particular chapters 9, pp. 316-359.*
"SSH Secure Shell for Server Administrator's Guide", Aug. 2000, pp. 1-49.*

(Continued)

*Primary Examiner* — Christian LaForgia
*Assistant Examiner* — Canh Le
(74) *Attorney, Agent, or Firm* — Harrington & Smith

(57) ABSTRACT

A method of establishing a secure communication channel between end nodes of an IP communication network via one or more intermediate nodes using the Secure Shell, SSH, protocol, the method comprising defining an SSH configuration file containing a plurality of sections, each section defining parameter values for a corresponding hop of the tunnel and an identification of the section defining parameter values for any subsequent hop. At that end node, a first instance of an SSH client is established, with the name of the configuration file being an initialization value for the first instance, and using the parameter values contained in a first section of the configuration file to establish a first SSH connection to the next node in the sequence. Following establishment of said first SSH connection, one or more further instances of the SSH client are established, with an identification of said configuration file and an identification of a corresponding section of the configuration file being an initialization value for an SSH instance, the or each further instance using the parameter values contained in the corresponding named section of the configuration file to establish an SSH connection to a subsequent node in the sequence over the already established SSH connection(s).

14 Claims, 2 Drawing Sheets

U.S. PATENT DOCUMENTS

2005/0091482 A1* 4/2005 Gray et al. .................. 713/151

OTHER PUBLICATIONS

SSH Secure Shell for Workstations Windows Client version 3.2.3 User Manual, Jan. 2003, pp. 1-209.*

WO 03/015360 A3 published Feb. 20, 2003.

http://secu.fatb.org/book/NetWork/NetworkingBookshelf_2ndEd/ssh/index.htm, "SSH: The Secure Shell, The Definitive Guide", $1^{st}$ Edition, Feb. 2001, Daniel J. Barrett and Richard E. Silverman, See in particular chapters 7, 11.5, 16.4 and 16.5.

* cited by examiner

SECURING A DATA TRANSMISSION CHANNEL

FIELD OF THE INVENTION

1. Field of the Invention

The present invention relates to a method and apparatus for securing a data transmission channel and more particularly to a method and apparatus for securing a data transmission channel using the Secure Shell (SecSH or SSH) protocol.

2. Background to the Invention

Electronic communication over insecure communication channels typically requires as a key component a data encryption/decryption and authentication application. The IETF standard known as SSH protocol provides support for secure remote login, secure file transfer, and secure TCP/IP and X11 forwardings. SSH can automatically encrypt, authenticate, and compress transmitted data. Stated aims of the SSH protocol include:

The provision of strong security against cryptanalysis and protocol attacks;

The ability to work well without a global key management capability or certificate infrastructure;

The ability to utilise existing certificate infrastructures (e.g., X.509, SPKI, DNSSEC) when available; and Ease of deployment and use, requiring minimum or no manual interaction from users.

In a typical use scenario, a user possessing a client terminal is registered with a corporate Local Area Network (LAN). When connected directly to the LAN, e.g. via an office PC, the user can access data stored on the LAN and access services of the LAN. When the user "roams" outside of the LAN, he is able to attach to the LAN using a suitable "client" terminal, such as a PC (home), laptop, PDA or smartphone, and the SSH protocol. In some cases, the client terminal may connect directly to a gateway server of the LAN, in which case a single SSH connection is established between the client terminal and the gateway server. However, in some cases the secure connection must pass through one or more intermediate servers, with a requirement that "inner" SSH connections are tunnelled through "outer" SSH connections. This is necessary, for example, where individual servers are controlled by different operators and each operator requires that users be authenticated by that operator (i.e. an intermediate server is not allowed merely to "route" an SSH connection to an end-point server).

Referring to FIG. 1 there is illustrated a so-called "multi-hop" connection in which a client terminal connects to a server C (e.g. a LAN gateway server) via two intermediate servers A and B. In this example it is assumed that the connections between the client terminal and server A and between server A and server B need to be authorised and secured, but that this is not necessary for the connection between server B and server C (e.g. because both server B and server C are located within the same corporate network). The aim of the procedure is that the application running at the client and which wishes to send or receive data over the connection (e.g. a web browser or FTP server) does not see the intermediate servers A and B and sees only the server C. SSH assumes that the servers and the client terminal are connected via TCP/IP.

An SSH connection is usually initiated by running an executable file at the client terminal. For example, the F-Secure SSH™ application runs the fsshclient.exe file. Execution of the fsshclient.exe file results in the user being requested to enter a number of initialisation values. For a single hop connection, these initialisation values are the IP address or URL of the gateway server and the gateway server port number to which the connection is to be established (typically the initial SSH connect request is sent to port 22 of the gateway server, with the actual connection being established to the other, specified port). In response to receipt of the connection setup request, the gateway may request that the user enter a valid username and password before the connection can be established. Alternatively, public-private user keys, or X.509 certificates based on Public Key Infrastructure (PKI) may be used.

In an alternative connection set-up scenario, the initialisation values are saved in a configuration file, and a user launches the connection by opening the configuration file. In a typical scenario, an icon representing the configuration file is displayed as an icon on a PC display, and the user launches the connection by double clicking the icon. Opening the configuration file automatically causes the SSH application to open in the same way that opening a Microsoft Word™ document causes the Word application to open.

FIG. 2 illustrates the main steps involved in setting up an example multi-hop connection as illustrated in FIG. 1. These are:

The procedure described above is carried out to establish a first instance of an SSH client and an SSH connection from the client terminal to server A (FIG. 2). This requires that the user specify the IP address (hostname) of server A and the port to which the connection is to be made, usually port 22.

The user requests port forwarding at the first SSH client instance, such that the instance listens to local port 1080 of the client terminal and then forwards this connection to port 22 at server B. The user must of course specify the IP address of server B.

The user then creates a further instance of the SSH client (e.g. by running fsshclient.exe), specifying as initialisation values the local host and a local port number. The SSH connection request is sent to local port 1080 of the client terminal which is being listened to by the first SSH client instance. This first instance forwards the connection request, over the SSH connection already established to server A, to port 22 of server B. The user is required to enter the username and password for server B.

Finally, the user requests port forwarding at the second instance of the SSH client, such that the second instance will listen to local port 1090 of the client terminal and then forward this connection to port 80 at server C. However, it does this via local host port 1080 as this is the port to which the second SSH client instance is attached. Local port 1080 is of course listened to by the first SSH client instance, which forwards the connection through the first SSH tunnel to port 80 of server C.

By starting a user application to URL http://localhost: 1090 (e.g. this may be by opening a web browser and entering "http://localhost: 1090" as the URL), the connection will be forwarded, via local host port 1080 and the first and second SSH tunnels, to port 80 of server C.

It will be appreciated that the procedure for setting up a multi-hop SSH connection requires that the user run the SSH application once for each hop of the connection which is to be authenticated and secured, e.g. two times in the scenario of FIG. 2. A typical user is unlikely to be aware that a multi-hop connection is required, and is unlikely to want to have to remember that the SSH application must be executed several times and the order in which the hops must be established.

SUMMARY OF THE INVENTION

It is an object of the present invention to simplify the procedure for establishing multi-hop SSH connections. This and other objects are achieved at least in part by defining a configuration file for a multi-hop SSH connection, with the file containing named sections for each hop.

According to a first aspect of the present invention there is provided method of establishing a secure communication channel between end nodes of an IP communication network via one or more intermediate nodes using the Secure Shell, SSH, protocol, the method comprising:

1) defining an SSH configuration file containing a plurality of sections, each section defining parameter values for a corresponding hop of the tunnel and an identification of the section defining parameter values for any subsequent hop;
2) making the configuration file available to an end node;
3) at that end node, establishing a first instance of an SSH client, with the name of the configuration file being an initialisation value for the first instance, and using the parameter values contained in a first section of the configuration file to establish a first SSH connection to the next node in the sequence;
4) following establishment of said first SSH connection, establishing one or more further instances of the SSH client, with an identification of said configuration file and an identification of a corresponding section of the configuration file being an initialisation value for an SSH instance, the or each further instance using the parameter values contained in the corresponding named section of the configuration file to establish an SSH connection to a subsequent node in the sequence over the already established SSH connection(s).

The end nodes of the secure connection may or may not be end nodes of communication channel. That is to say that the communication channel may extend from one or both of the end nodes to a further node.

In an embodiment of the invention, said configuration file is pre-stored in a memory of the initiating end node. The configuration file may be downloaded to the memory over an IP network, e.g. over the Internet from a web server.

Establishment of an SSH client instance may require the user to enter authentication information such as a username and password in order to authenticate the user to the terminating node for the client. Alternatively, PKI may be used to authenticate the user.

In certain embodiments of the invention, said initiating end node is a client terminal and the other nodes are servers. The peer end node in the sequence may be a gateway server to a corporate LAN or WAN.

Preferably, the final instruction of each section of the configuration file, with the exception of the final section, is an instruction to establish the next SSH client instance. This instruction identifies the configuration file and the name of the section of the configuration file defining the next SSH connection to be established.

In one embodiment of the present invention, step 2) above comprises opening the configuration file, the opening of the configuration file causing the SSH application to be executed thereby establishing the first said SSH client instance.

In another embodiment of the invention step 2) comprises establishing an instance of the SSH client and opening the configuration file from within the SSH client instance. In yet another embodiment of the invention, the SSH instance is automatically established at the initiating end node by downloading the configuration file from a remote server. This may be triggered for example by a user clicking on a hyperlink of a web page.

Preferably, port forwarding is applied to at least certain of the SSH client instances.

According to a second aspect of the present invention there is provided a computer storage medium having stored thereon a program for causing a node of an IP-based communication network to establish a secure communication channel between end nodes of an IP communication network via one or more intermediate nodes using the Secure Shell, SSH, protocol, by:

establishing a first SSH client instance at the first mentioned node, with an identification of a configuration file being an initialisation value for the SSH client instance, the configuration file containing a plurality of sections, each section defining parameter values for a corresponding hop of the tunnel and an identification of the section defining parameter values for any subsequent hop;

establishing a first SSH connection to the next node in the sequence on the basis of the parameter values defined in a first section of the configuration file;

following establishment of the first SSH client instance, automatically establishing one or more further SSH client instances, with an identification of said configuration file and an identification of the corresponding section of the configuration file being an initialisation value for a client; and the or each further instance using the parameter values contained in the corresponding named section of the configuration file to establish an SSH connection to a subsequent node in the sequence over the already established SSH connection(s).

According to a third aspect of the present invention there is provided a node comprising a computer storage medium according to the above second aspect of the invention, and processor means for implementing the program.

According to a fourth aspect of the present invention there is provided a method of establishing a secure communication channel between end nodes of an IP communication network via one or more intermediate nodes using the Secure Shell, SSH, protocol, the method comprising:

defining an SSH configuration file comprising a plurality of sections each of which provides input data to a corresponding SSH client instance and each section defining parameter values for a corresponding hop of the tunnel and an identification of the section defining parameter values for any subsequent hop, at least the intermediate sections also containing a command to automatically establish an SSH client instance for the next section; and making said configuration file available to one of said end nodes.

DETAILED DESCRIPTION OF THE CERTAIN EMBODIMENTS

Figure 1:
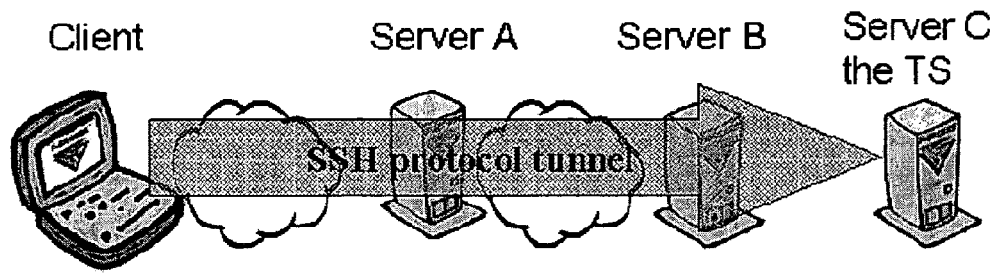
FIG. 1 illustrates a multi-hop SSH connection established via multiple intermediate servers.
Figure 2:
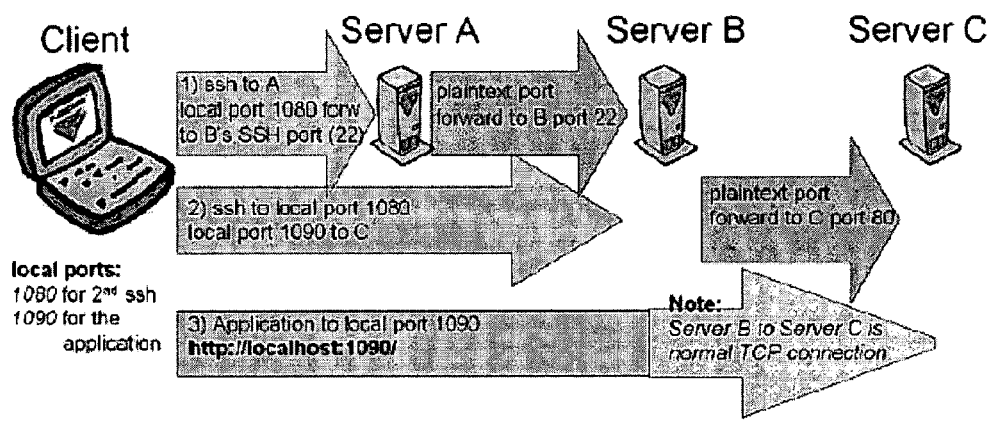
FIG. 2 illustrates the steps involved in establishing the multi-hop SSH connection of FIG. 1.

The present invention may be embodied as a software application and associated stored data capable of running on a conventional personal computer, laptop computer, PDA, smartphone, or other suitable computer device. The requirements of the device are a suitable processor, storage memory, and operating system, and the possibility to connect to an IP network (e.g. the Internet). The connection to an IP network may involve a fixed wire access network or a wireless access network (e.g. 3G, WAN, WiFi, Bluetooth™, etc).

The computer device has access to an SSH client configuration file which is stored in its memory either permanently or temporarily. The file may be stored in the memory by, for example, a system administrator for the network (LAN) to which the device is to connect or may be downloaded from a web server (e.g. operated by that system administrator). The configuration file may alternatively be created by an end user using some appropriate set-up procedure. The configuration file component controls the behaviour of an SSH application. The file contains pre-defined configuration directives that define what the SSH application does and how it does it. The configuration file is divided into named sections. An example configuration file is illustrated in Table 1 below.

In a typical scenario, an icon corresponding to the configuration file is shown on a display of the end-user terminal. In order to establish a multi-hop SSH connection the user double clicks on the configuration file icon. A property of the configuration file is the name of the application which is required to open the file, e.g. F-Secure SSH, such that by double clicking on the file an instance of the SSH application/client is executed. The SSH client then executes the commands given in the first section of the client configuration file to establish a first SSH connection to server A. Thus, referring to Table 1, an SSH connection is from the client terminal to server A, with port forwarding from local host (of the client terminal) port 1080 to port 22 of Server B. This process will typically require the user to enter a username and password to allow server A to authenticate the user. The final command in the first named section of the configuration file is a command to establish a further SSH client instance, i.e. "fsshclient.exe". Initialisation values for this client are the name of the second section of the configuration file (in this case "Joe", and a command "%P" which is used to signify the existing configuration file).

A new SSH client instance is established automatically, and a second SSH connection is set-up using the parameter values specified in the second named section (i.e. to port 1080 at the local host), such that a secure tunnel is created between the client terminal and server B through the first SSH tunnel (client to server A). It is noted that the second SSH instance does not know what is connected to port 1080 of the local host and does not need to know this as the port forwarding already established ensures that port 1080 is "connected" to port 22 of server B. Again, the user will typically be requested to enter a username and password to allow server B to authenticate the user. Port forwarding from local host port 1090 to port 80 of server C is requested.

The final command of the second named section is the command "mozilla.exe" which establishes an instance of a user application at the client terminal, e.g. a web browser. The initialisation value of the application instance in this example is the URL http://localhost:1090, which causes the application to send a data download request to local host 1090. The second SSH client instance is of course listening to port 1090, and forwards the request to port 80 of server C according to the port forwarding rule already defined, i.e. via the second SSH tunnel. The request is sent via port 1080 as this is the port to which the second SSH client instance is connected. The first SSH client instance is listening to port 1080 and forwards the request via the first SSH tunnel.

Figure 3:
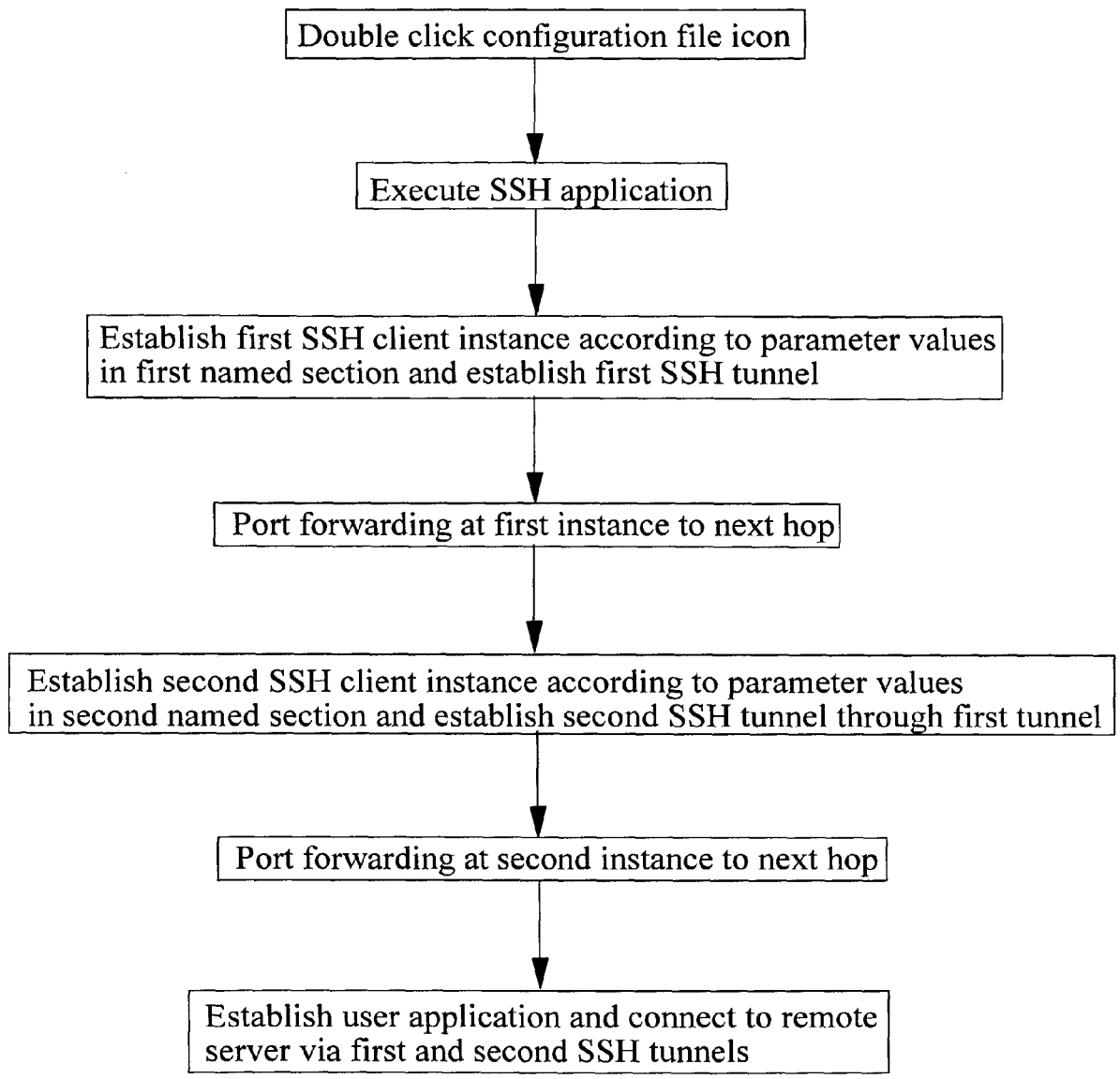
FIG. 3 is a flow diagram illustrating steps for automatically establishing a multi-hop SSH connection.

The complete procedure is illustrated in the flow diagram of FIG. 3. It will be appreciated that the procedure can be extended to cope with more than two intermediate servers (which require user authentication) and more than two SSH tunnels.

The procedure is essentially fully automated once the configuration file has been created. The end user need have little or no knowledge of the multi-hop tunnel and need only be provided with the necessary usernames and passwords. Even these may be dispensed with if PKI is used to authenticate the user to the various servers.

In an alternative embodiment, the end-to-end SSH connection is establish by a user clicking on a hyperlink of a web page. The web page may be, for example, downloaded from a publicly available web server (over the Internet) and may be a corporate home page. By clicking the link, the user initiates the downloading of a configuration file. The downloaded file is auto-run on the user's terminal. This procedure is extremely simple from the user's point of view. It will be appreciated that such simplicity is not achievable with conventional solutions which would have required, at the very least, the user to click on multiple separate links in sequence, one for each SSH client.

It will be appreciated by the person of skill in the art that various modifications may be made to the above described embodiments without departing from the scope of the present invention. For example, the configuration file may be a conventional file or may be constructed as a series of commands in a database, the database being queried by an SSH client instance. An example of such an embodiment is one making use of register keys.

TABLE 1

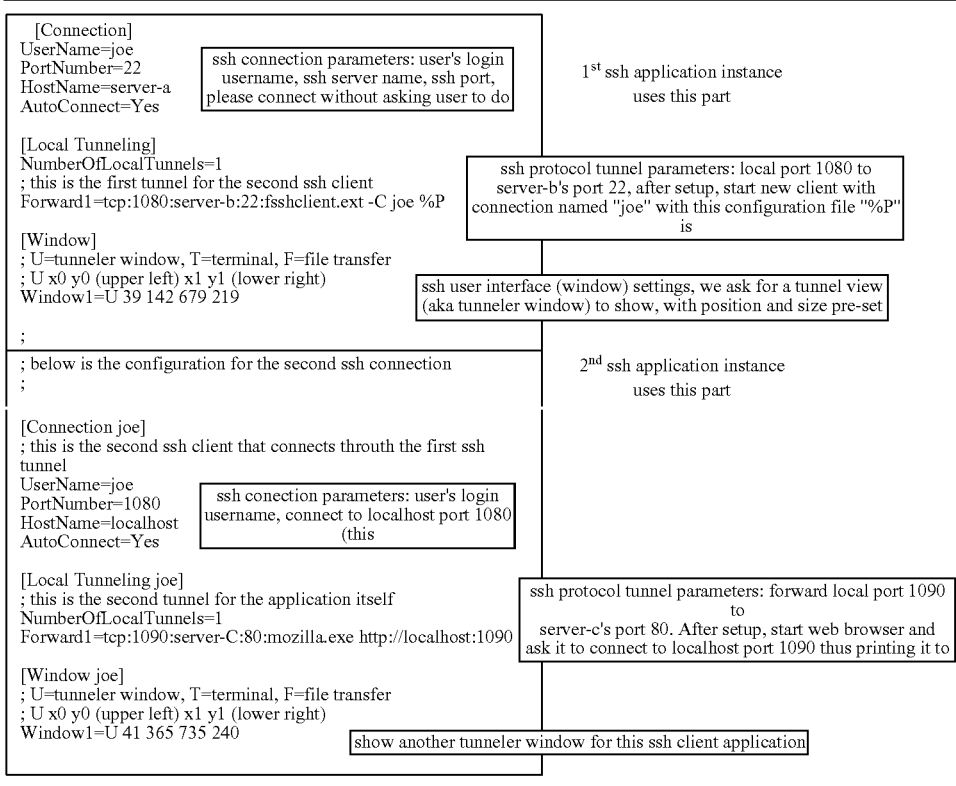

We claim:

1. A method of establishing a secure communication channel between first and second computer devices of an IP communication network via one or more intermediate computer devices using a Secure Shell (SSH) protocol, the method comprising:
storing in a memory of the first computer device an SSH configuration file comprising a plurality of sections, each section defining parameter values for a corresponding hop of a multi-hop tunnel and an identification of the section defining parameter values for any subsequent hop;
at said first computer device, establishing a first instance of an SSH client, with a name of the SSH configuration file being an initialization value for the first instance, and using the parameter values within a first section of the SSH configuration file to establish a first SSH connection to a next intermediate computer device, in sequence, the next intermediate computer device being one of the one or more intermediate computer devices; and
following establishment of said first SSH connection, establishing one or more further instances of the SSH client, with an identification of said SSH configuration file and an identification of a corresponding section of the SSH configuration file being an initialization value for a corresponding further instance of the SSH client, each further instance of the SSH client using the parameter values with the corresponding named section of the SSH configuration file to establish an SSH connection to a subsequent computer device in the sequence over the already established SSH connection(s), wherein a final SSH connection provides an end-to-end tunnel extending between said first and second computer devices via each of the said one or more intermediate computer devices.

2. The method according to claim 1 in which storing comprises pre-storing said SSH configuration file in the memory of the first computer device.

3. The method according to claim 1 in which storing comprises downloading the SSH configuration file into the memory of the first computer device over an IP network from a web server.

4. The method according to claim 1, wherein the establishment of each SSH client instance comprises a step of authenticating a user of the first computer device to the intermediate or the second computer device using a username and password entered by the user.

5. The method according to claim 1, wherein a final instruction of each named section of the SSH configuration file, with the exception of a final one of the named sections, is an instruction to establish the next SSH client instance, the instruction identifying the SSH configuration file and the name of the section of the SSH configuration file defining the next SSH connection to be established.

6. The method according to claim 1, wherein the SSH configuration file is made available to the first computing device by opening the SSH configuration file, the opening of the SSH configuration file causing an SSH application to be executed thereby establishing the first said SSH client instance.

7. The method according to claim 1, wherein an SSH application is automatically executed at the first computer device by downloading the SSH configuration file from a remote server.

8. A non-transitory computer storage medium having stored thereon a program for causing a node of an IP-based communication network to establish a secure communication channel between first and second computer devices of an IP communication network via a sequence of one or more intermediate computer devices using a Secure Shell (SSH) protocol, by:

establishing a first SSH client instance at the first computer device, with an identification of a configuration file being an initialization value for the SSH client instance, the configuration file comprising a plurality of sections, each section defining parameter values for a corresponding hop of a multi-hop tunnel and an identification of the section defining parameter values for any subsequent hop;

establishing a first SSH connection to a first intermediate computer device in the sequence on the basis of the parameter values defined in a first section of the configuration file;

following establishment of the first SSH client instance, automatically establishing one or more further SSH client instances, with an identification of said configuration file and an identification of the corresponding section of the configuration file being an initialization value for a client; and each further SSH client instance using the parameter values within the corresponding named section of the configuration file to establish an SSH connection to a subsequent intermediate computer device in the sequence or to said second computer device over the already established SSH connection(s), wherein a first SSH connection provides an end-to-end tunnel extending between said first and second computer devices via each of the said one or more intermediate computer devices.

9. The non-transitory computer storage medium according to claim 8, further comprising pre-storing said SSH configuration file in the memory of the first computer device, prior to establishing the first SSH client instance at the first computer device.

10. The non-transitory computer storage medium according to claim 8, in which the SSH configuration file is downloaded into the memory of the first computer device over an IP network from a web server.

11. The non-transitory computer storage medium according to claim 8, wherein the establishment of each SSH client instance comprises a step of authenticating a user of the first computer device to the intermediate or the second computer device using a username and password entered by the user.

12. The non-transitory computer storage medium according to claim 8, wherein a final instruction of each named section of the SSH configuration file, with the exception of a final one of the named sections, is an instruction to establish the next SSH client instance, the instruction identifying the SSH configuration file and the name of the section of the SSH configuration file defining the next SSH connection to be established.

13. The non-transitory computer storage medium according to claim 8, wherein establishing the first SSH client instance at the first computing device comprises opening the SSH configuration file, the opening of the SSH configuration file causing an SSH application to be executed thereby establishing the first said SSH client instance.

14. The non-transitory computer storage medium according to claim 8, wherein an SSH application is automatically executed at the first computer device by downloading the SSH configuration file from a remote server.

\* \* \* \* \*